Sept. 30, 1969  H. W. RIKE  3,469,897
LOCK PLATE FOR FIXED MOTOR ROTOR BEARING
Filed Feb. 21, 1968
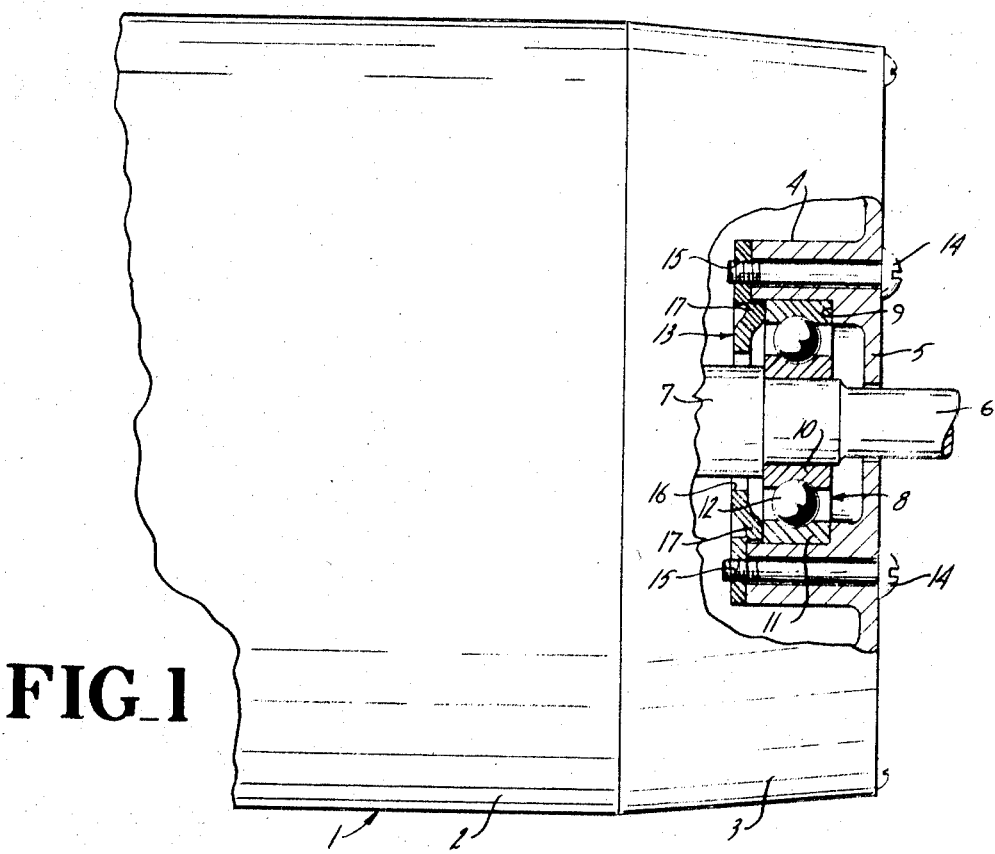
FIG_1
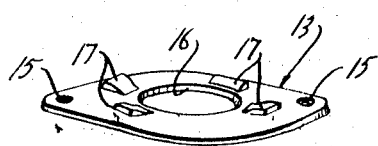
FIG_2
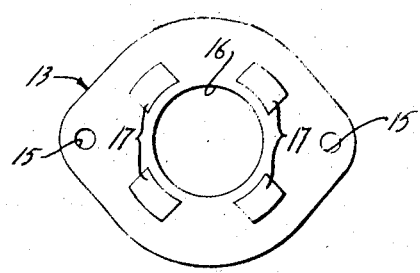
FIG_3
INVENTOR.
HOWARD W RIKE
BY Howard J Barnett
Attorney

United States Patent Office 3,469,897
Patented Sept. 30, 1969

3,469,897
LOCK PLATE FOR FIXED MOTOR ROTOR BEARING
Howard W. Rike, Kettering, Ohio, assignor to A. O. Smith Corporation, Milwaukee, Wis., a corporation of New York
Filed Feb. 21, 1968, Ser. No. 707,116
Int. Cl. F16c 33/30
U.S. Cl. 308—236                                3 Claims

ABSTRACT OF THE DISCLOSURE

An annular stamped steel lock plate having equicircumferentially spaced tabs lanced therethrough and extending radially outwardly to contact the outer bearing race of a fixed rotor bearing assembly and apply a uniform locking force to the bearing. The tabs are located so that the bearing race will not deform under the axial locking force.

BACKGROUND OF THE INVENTION

A typical fixed bearing unit is shown in U.S. Patent 2,837,382. In column 2, lines 40-49 and FIG. 1 of this patent, a conventional fixed bearing retaining means (ring 28) is described, in which the clamping ring 28 is held in place by screws 29. The purpose of the ring 28 is to clamp the outer bearing race 23 firmly against the bearing housing 18 to prevent rotation of the outer race and also, to prevent axial movement.

In the past, the clamping rings for fixed bearings have been made of castings and machined to fit, so that a uniform clamping force would be distributed around the circumference of the outer race of the fixed bearing. The uniform seating of the fixed bearing is important because the "working" end of the motor shaft customarily extends from the adjacent end of the motor, and is subjected to unbalanced loads. If the outer bearing race is not uniformly secured to the bearing housing around its entire circumference, then distortion can occur, causing irregular bearing wear, motor overloading and premature bearing failure.

The cast, machined clamping rings are expensive to fabricate so attempts have been made to replace the castings with a simple, stamped metal ring, clamped in place by two clamping screws extending through the annular wall of the fixed bearing housing at opposite edges of the stamped metal ring. However, the stamped metal ring tended to deform slightly as the clamping screws were tightened and pressure was applied to the outer bearing race only at two points, 180 degrees apart, where the clamping screws connected to the stamped metal ring. This unequal pinching action deformed the outer race and caused premature bearing failure.

This invention provides a modified and improved stamped metal ring which replaces the more costly cast and machined clamping ring and still provides a uniform clamping pressure, evenly distributed around the outer race of the fixed motor rotor bearing of an electric motor. The uniform clamping pressure is accomplished by providing a plurality of lanced tabs or ears equicircumferentially spaced around the periphery of the stamped metal clamping ring, or bearing lock plate. When the clamping ring securing screws are tightened to lock the outer race in fixed position, the lanced tabs contact it around its periphery and apply uniform locking pressure to it. Any deformation of the clamping ring is canceled by the counterbalancing effect of the lanced tabs tightened into locking position.

This invention, therefore, provides an inexpensive, stamped metal fixed bearing clamping ring which effectively replaces the more expensive, cast and machined clamping rings, while retaining all the advantages of the cast ring. Uniform clamping and locking pressure is accomplished by the tab arrangement, and the new stamped clamping ring can be mass produced at a much more rapid rate at considerably less cost.

It is important to distinguish the subject clamping ring lock plate from the spring type antirotation resilient bearing cap members used in conjunction with the axially movable bearings usually employed at the nonloaded end of the rotor shaft. These devices are intentionally made to be yieldable in an axial direction to accommodate expansion and contraction of the motor shaft. In these devices, axial motion between the bearing outer race is intended and provided for, and the devices are intended primarily to resiliently grip the outer bearing race to prevent rotation thereof, without restraining axial movement of the bearing. Typical devices of this type are shown in the above mentioned U.S. Patent 2,837,382 and U.S. Patents 2,504,776 and 2,877,068. None of these antirotation, load spring devices are firmly anchored in position by clamping screws, but are "caged" by the other components, such as the bearing housing and the bearing which, as mentioned above, is axially movable.

SUMMARY OF THE INVENTION

The invention is a stamped metal clamping ring for fixed rotor bearings which are usually disposed at the load end of an electric motor shaft and which may replace a more expensive cast clamping ring. A plurality of lanced tabs distributed equicircumferentially around the clamping ring are secured firmly against the outer race of the fixed rotor shaft bearing by means of two clamping screws extending through the motor housing. The outer bearing race is held firmly in place by a uniformly applied pressure from the tabs of the clamping ring.

BRIEF DESCRIPTION OF THE DRAWINGS

FIGURE 1 of the drawings is a side elevation view of an electric motor with parts broken away, showing the relative disposition of the fixed rotor bearing, the bearing housing, rotor shaft and the bearing clamping assembly;

FIG. 2 is a perspective view of stamped metal clamping ring of the invention; and FIG. 3 is a plan view of the clamping ring shown in FIG. 2.

DESCRIPTION OF THE PREFERRED EMBODIMENT

As shown in the drawings, an electric motor 1 includes a central housing 2 and an end bell 3. The end bell 3 includes a centrally disposed recessed bearing housing 4 and a hub portion 5. A rotor shaft extension 6 extends outwardly from a rotor shaft 7 through the housing 4 and the hub portion 5.

A fixed ball bearing unit 8 is disposed within a cylindrical recess 9 in the bearing housing 4, and includes an inner race 10 press fit around the rotor shaft extension 6, an outer race 11, which fits closely in the cylindrical recess 9 of the bearing housing 4, and a plurality of antifriction bearing elements, such as balls 12, disposed between the inner and outer races 10 and 11, respectively, to permit relatively friction-free rotation of rotor shaft 7 and rotor shaft extension 6.

The fixed ball bearing unit 8 is held in fixed relation in the recess 9 of the housing 4 by means of a stamped metal ring lock plate 13, held in place by a plurality of clamping bolts 14, which extend through the housing 4 into threaded engagement with threaded openings 15 and the lock plate 13.

The stamped metal ring lock plate 13 includes a central opening 16 to accommodate the rotor shaft 7 and is provided with a plurality of equicircumferentially spaced lanced tabs 17 which effectively balance and uniformly distribute the clamping pressure of the lock plate 13 around the periphery of the outer bearing race 11. The tabs 17 hold the outer bearing race 11 firmly against the end of the recess 9 in the bearing housing 4 thereby preventing rotation of the outer bearing race 11 and holding the entire bearing unit 8 against axial movement.

Various modes of carrying out the invention are contemplated as being within the scope of the following claims particularly pointing out and distinctly claiming the subject matter which is regarded as the invention.

I claim:

1. A stamped metal lock plate assembly for a fixed bearing unit of a motor shaft of a motor including a bearing housing having a cylindrical recess therein for receiving a fixed bearing having the motor shaft extending therethrough, said fixed bearing comprising an inner race press fit to said motor shaft, an outer race press fit into said cylindrical recess, and a plurality of relatively friction-free bearing means disposed therebetween for allowing rotation of said motor shaft relative to said bearing housing, said stamped metal lock plate assembly comprising a stamped metal ring secured over the end of said cylindrical recess, said ring having a plurality of lanced tabs equicircumferentially spaced around the periphery thereof to engage and uniformly hold said outer race of said bearing against rotation and against axial movement of said bearing assembly in said bearing housing.

2. The apparatus of claim 1, in which said stamped metal ring is secured to the inner end of said bearing housing by a plurality of bolt attaching means equicircumferentially spaced from each other around the periphery of said stamped metal ring.

3. The apparatus of claim 2, in which the bolt attaching means comprises a pair of clamping bolts extending inwardly through said bearing housing, the inner ends of said bolts each being received in a corresponding threaded opening in said stamped metal ring, said threaded openings being disposed about 180 degrees apart around the periphery of said stamped metal ring, and each threaded opening being equiangularly spaced from the respective adjacent lanced tabs to thereby uniformly distribute the clamping force of said stamped metal lock plate assembly around the outer race of said bearing assembly.

References Cited

UNITED STATES PATENTS 2,837,382   6/1958   Schaefer           308—236

MARTIN P. SCHWADRON, Primary Examiner

FRANK SUSKO, Assistant Examiner